US009952974B2

United States Patent
Anderson et al.

(10) Patent No.: US 9,952,974 B2
(45) Date of Patent: Apr. 24, 2018

(54) PRESERVATION OF MODIFIED CACHE DATA IN LOCAL NON-VOLATILE STORAGE FOLLOWING A FAILOVER

(71) Applicant: INTERNATIONAL BUSINESS MACHINES CORPORATION, Armonk, NY (US)

(72) Inventors: Kyler A. Anderson, Sahuarita, AZ (US); Kevin J. Ash, Tucson, AZ (US); Lokesh M. Gupta, Tucson, AZ (US); Matthew J. Kalos, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/175,791

(22) Filed: Jun. 7, 2016

(65) Prior Publication Data
US 2017/0351613 A1   Dec. 7, 2017

(51) Int. Cl.
*G06F 12/08* (2016.01)
*G06F 3/06* (2006.01)
(Continued)

(52) U.S. Cl.
CPC ........ *G06F 12/0833* (2013.01); *G06F 3/0619* (2013.01); *G06F 3/0655* (2013.01);
(Continued)

(58) Field of Classification Search
CPC .... G06F 12/0833; G06F 12/128; G06F 12/02; G06F 12/0804; G06F 12/0866; G06F 2212/69; G06F 2212/621; G06F 3/0655; G06F 3/0619; G06F 3/0688; G06F 3/0614; G06F 3/0617; G06F 3/0635; G06F 3/065;
(Continued)

(56) References Cited

U.S. PATENT DOCUMENTS

| 5,437,022 A | * | 7/1995 | Beardsley | ........... | G06F 11/1666 |
| | | | | | 711/120 |
| 5,717,884 A | * | 2/1998 | Gzym | ................. | G06F 12/0866 |
| | | | | | 711/206 |

(Continued)

FOREIGN PATENT DOCUMENTS

WO    WO2010020992 A1    2/2010

OTHER PUBLICATIONS

S. Kim, et al., "Predicting Faults from Cached History", IEEE, 2007, 29th International Conference on Software Engineering, pp. 10.

*Primary Examiner* — Michael Krofcheck
(74) *Attorney, Agent, or Firm* — Rabindranath Dutta; Konrad Raynes Davda & Victor LLP

(57) ABSTRACT

A dual-server based storage system maintains a first cache and a first non-volatile storage (NVS) in a first server, and a second cache and a second NVS in a second server, where data in the first cache is also written in the second NVS and data in the second cache is also written in the first NVS. In response to a failure of the first server, a determination is made as to whether space exists in the second NVS to accommodate the data stored in the second cache. In response to determining that space exists in the second NVS to accommodate the data stored in the second cache, the data is transferred from the second cache to the second NVS.

17 Claims, 11 Drawing Sheets

(51) Int. Cl.
  *G06F 12/0831* (2016.01)
  *G06F 12/128* (2016.01)
(52) U.S. Cl.
  CPC .......... *G06F 3/0688* (2013.01); *G06F 12/128*
   (2013.01); *G06F 2212/621* (2013.01); *G06F*
   *2212/69* (2013.01)
(58) Field of Classification Search
  CPC .. G06F 3/0683; G06F 3/0689; G06F 11/0703;
   G06F 11/0709; G06F 11/0727; G06F
   11/1423; G06F 11/1428; G06F 11/1612;
   G06F 11/165; G06F 11/1666; G06F
   11/2092; G06F 3/0685
  See application file for complete search history.

(56) References Cited

U.S. PATENT DOCUMENTS

| | | | | |
|---|---|---|---|---|
| 6,513,097 | B1 * | 1/2003 | Beardsley | ........... G06F 11/0724 711/113 |
| 7,680,982 | B2 | 3/2010 | Ash et al. | |
| 7,809,975 | B2 | 10/2010 | French et al. | |
| 8,132,045 | B2 | 3/2012 | Avila et al. | |
| 8,275,959 | B2 | 9/2012 | Ghanem et al. | |
| 2004/0059870 | A1 * | 3/2004 | Ash | ...................... G06F 11/1666 711/119 |
| 2008/0201523 | A1 * | 8/2008 | Ash | ...................... G06F 12/0804 711/113 |
| 2009/0300298 | A1 * | 12/2009 | Ash | ...................... G06F 11/1441 711/156 |
| 2014/0115390 | A1 | 4/2014 | Coile et al. | |
| 2014/0281064 | A1 * | 9/2014 | Imazaki | .................. G06F 13/20 710/74 |
| 2015/0347247 | A1 | 12/2015 | Baek | |
| 2017/0109226 | A1 * | 4/2017 | Ash | ...................... G06F 11/0772 |

* cited by examiner

PRESERVATION OF MODIFIED CACHE DATA IN LOCAL NON-VOLATILE STORAGE FOLLOWING A FAILOVER

BACKGROUND

1. Field

Embodiments relate to the preservation of modified cache data in local non-volatile storage following a failover.

2. Background

A storage system may control access to storage for one or more host computational devices that may be coupled to the storage system over a network. A storage management application that executes in the storage system may manage a plurality of storage devices, such as disk drives, tape drives, flash drives, direct access storage devices (DASD), etc., that are coupled to the storage system. A host may send Input/Output (I/O) commands to the storage system and the storage system may execute the I/O commands to read data from the storage devices or write data to the storage devices.

The storage system may include two or more servers, where each server may be referred to as a node, a storage server, a processor complex, a Central Processor Complex (CPC), or a Central Electronics Complex (CEC). Each server may be included in a cluster. Each server may have a plurality of processor cores and the servers may share the workload of the storage system. In a two server configuration of the storage system, either server can failover to the other if there is a failure or a planned downtime for one of the two servers. For example, a first server may failover to the other is there is a failure of a second server.

The storage system attempts to maintain two copies of the data while data is moving through the storage system. The servers have two areas of their primary memory that are used for holding host data: cache and non-volatile storage (NVS). NVS contains write data until the data is destaged from the cache to the storage drives. When a write is sent to a volume and both the servers are operational, the write data is placed into the cache of the owning server and into the NVS of the other server. The NVS copy of the write data may be accessed if a write failure occurs and the cache is empty or possibly invalid in the owning server. Otherwise, the NVS copy of the write data is discarded after destage operations from cache to the storage drives are complete.

Host systems may communicate with the dual server based storage system and write a type of data referred to as a DASD fast write (DFW) data. DFW data is initially stored by the two servers from host systems, and subsequently destaged to more permanent data storage, such as DASD or disk drives. The pair of servers provide backup to the data in that one set of dual mode DASD fast write data of a logical storage system (LSS) is stored in the cache data storage of a first server and in the non-volatile data storage of the second server, and dual mode DASD fast write data of another logical storage system is stored in the cache data storage of the second server and in the non-volatile data storage of the first server. As a result, all of the dual mode DASD fast write data is protected, for example against a power failure or reboot event, by being stored in a non-volatile storage in one of the servers.

U.S. Pat. No. 7,680,982 describes at least a data storage subsystem with disk storage and a pair of clusters, in which one set of direct access storage device (DASD) fast write data is in cache of one cluster comprising a first server and in non-volatile data storage of another cluster comprising a second server. In response to a failover of one of the pair of clusters (e.g., a second cluster) to a local cluster (e.g., a first cluster), the local cluster converts the DASD fast write data in local cache to converted fast write data (CDFW) to prioritize the converted data for destaging to disk storage. In response to a failure to destage, the local cluster allocates local non-volatile storage tracks and emulates a host adapter to store the converted fast write data by the local non-volatile storage.

SUMMARY OF THE PREFERRED EMBODIMENTS

Provided are a method, a system, a computer program product in which a dual-server based storage system maintains a first cache and a first non-volatile storage (NVS) in a first server, and a second cache and a second NVS in a second server, where data in the first cache is also written in the second NVS and data in the second cache is also written in the first NVS. In response to a failure of the first server, a determination is made as to whether space exists in the second NVS to accommodate the data stored in the second cache. In response to determining that space exists in the second NVS to accommodate the data stored in the second cache, the data is transferred from the second cache to the second NVS.

In certain embodiments, the transferring of the data from the second cache to the second NVS is performed prior to an attempt to destage the data from the second cache to secondary storage coupled to the dual-server based storage system.

In further embodiments, a preemptive retrostore is performed from the second cache to the second NVS to avoid failure during destage operations from the second cache to the secondary storage.

In additional embodiments, in response to a failover, every track from a converted direct access storage device fast write (CDFW) list is transferred to a destage wait list. A scan is performed to find and restore every track that has a restore required bit set.

In further embodiments, in response to completion of the scan, a new scan is started to find CDFW tracks that are on a CDFW list, a destage wait list, or a pinned retryable list and an attempt is initiated to retrostore the CDFW tracks.

In certain embodiments, the CDFW list is a global list of tracks to be destaged.

The destage wait list is a list of tracks that are ready to be destaged for every rank. The pinned retryable list comprises tracks that failed to destage and are not currently retrostored.

In further embodiments, if the second NVS is full then a CDFW track is added to the pinned retryable list.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

A dual-server based storage controller may maintain two copies of modified customer data. For even numbered logical storage systems (LSS), one copy of the modified customer data is in the cache of the first server, and the other copy of the modified customer data is in the NVS in second server. For odd numbered LSSs, one copy of the modified customer data is in the cache in second server and the other copy of the modified customer data is in the NVS in the first server.

A failover in the dual-server based storage system is an attempt to recover from a failure of one of the servers of the dual-server based storage system. During the failover, tracks are destaged from the cache of the operational server to the secondary storage, as the only copy of the modified data is in the cache of the operational server.

If the tracks in the cache of the operational server cannot be destaged (due to rank or adapter or other issues), then processes may try to retrostore the tracks into the local NVS. Retrostore is a process that allocates space in NVS, allocates an NVS track buffer, copies the modified customer data from the cache segments to the NVS segments, then sends a commit message to NVS. When data is moved from NVS to cache it is called restore. When data is moved from cache to NVS it is termed reverse restore or "retrostore".

While a destage of data from cache is in progress, there is a possibility of a power failure or a failure to destage because of unavailability of a secondary storage device to which data is being destaged from the cache. Certain embodiments provide a way to quickly perform retrostore operations to transfer the data into a local NVS of an operational server to protect the data against a power loss or a failure of the destage process. In the event of a failover in a dual-server based storage system, retrostore operations are performed to transfer tracks from the cache of the operational server to the NVS of the operational server if there is space in the NVS of the operational server, without waiting for destages to be performed from the cache of the operational server to secondary storage.

Certain embodiments, provide mechanisms to quickly preserve modified cache data in local NVS following a failover. If there is available space in the NVS then a retrostore is performed right away such that the window of possible loss for modified data stored in the cache may be reduced from minutes to a few seconds or less.

Exemplary Embodiments

Figure 1:
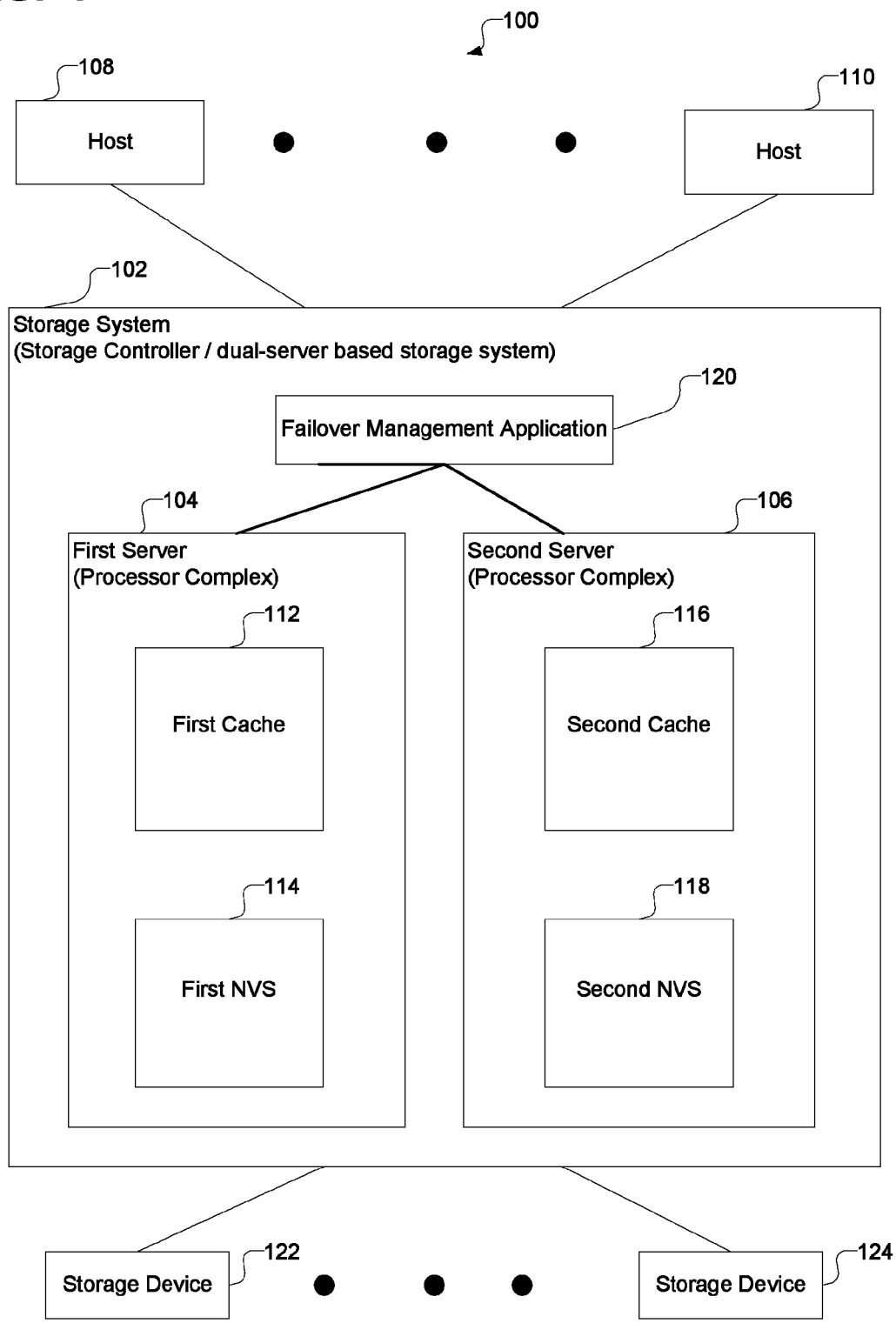
FIG. 1 illustrates a block diagram of a computing environment comprising a storage system comprising a first server and a second server, where the storage system communicates with a plurality of hosts over a network, in accordance with certain embodiments.

FIG. 1 illustrates a block diagram of a computing environment 100 comprising a storage system 102 comprising a first server 104 and a second server 106, where the storage system 102 communicates with a plurality of hosts 108, 110 over a network 111, in accordance with certain embodiments.

The storage system 102, the servers 104, 106 and the hosts 108, 110 may comprise any suitable computational device including those presently known in the art, such as, a personal computer, a workstation, a server, a mainframe, a hand held computer, a palm top computer, a telephony device, a network appliance, a blade computer, a processing device, a controller, etc. The plurality of servers 104, 106 may provide redundancy because if one server undergoes a failure from which recovery is not possible, an alternate server may perform the functions of the server that failed. Each of the plurality of servers 104, 106 may be referred to as a processing complex and may include one or more processors and/or processor cores.

The storage system 102, the servers 104, 106 and the hosts 108, 110 may be elements in any suitable network, such as, a storage area network, a wide area network, the Internet, an intranet. In certain embodiments, storage system 102, the servers 104, 106 and the hosts 108, 110 may be elements in a cloud computing environment.

The first server 104 includes memory comprising a first cache 112 and a first NVS 114, and the second server 106 includes memory comprising a second cache 116 and a second NVS 118.

The cache 112, 116 may in certain embodiments may comprise a write cache partitioned into one or more ranks, where each rank may include one or more storage tracks. The cache 112, 116 may be any suitable cache known in the art or developed in the future. In some embodiments, the cache 112, 116 may be implemented with a volatile memory and/or non-volatile memory. The cache 112, 116 may store both modified and unmodified data, where the cache 112,116 may periodically destage (i.e., move) data from the cache 112, 116 to one or more storage devices 122, 124 controlled by the servers 104, 106.

The NVS 114, 118 may also be referred to as a "persistent" cache and is implemented with non-volatile memory that may or may not utilize external power to retain data stored therein. In some embodiments, a backup power source, such as a battery, supplies the NVS 114, 118 with power to retain the data stored therein in case of power loss. The NVS 114, 118 may store modified data. An application is made aware that an I/O operation is complete once data has successfully been written to cache and the NVS. Data integrity and availability is maintained by retaining two copies of the data until it is hardened to disk, one copy in cache on one server and the second in NVS of the other server. NVS is protected by battery backup. Normal access to the data is from the copy retained in the cache. In certain embodiments, the NVS 114, 118 may also act like a write cache.

In certain embodiments, a failover management application 120 that executes in the storage system 102 provides a mechanism to quickly perform retrostore operations to transfer the modified data of a local cache of an operational server into a local NVS of the operational server to protect the modified data against a power loss or against a failure of destage operations from the local cache.

The failover management application 120 may execute in any or all of the servers 104, 106 or may be an application that executes when virtualization is performed to access the hardware elements of the storage system 102. In certain embodiments, the failover management application 120 may be implemented in software, firmware, hardware or any combination thereof.

It should be noted that the storage system 102 may be configured and accessed in many different ways. For example, virtualization may be performed to access the hardware elements of the storage system 102. Additionally, in certain embodiments, the storage system 102 may have a single server or more than two servers.

Figure 2:
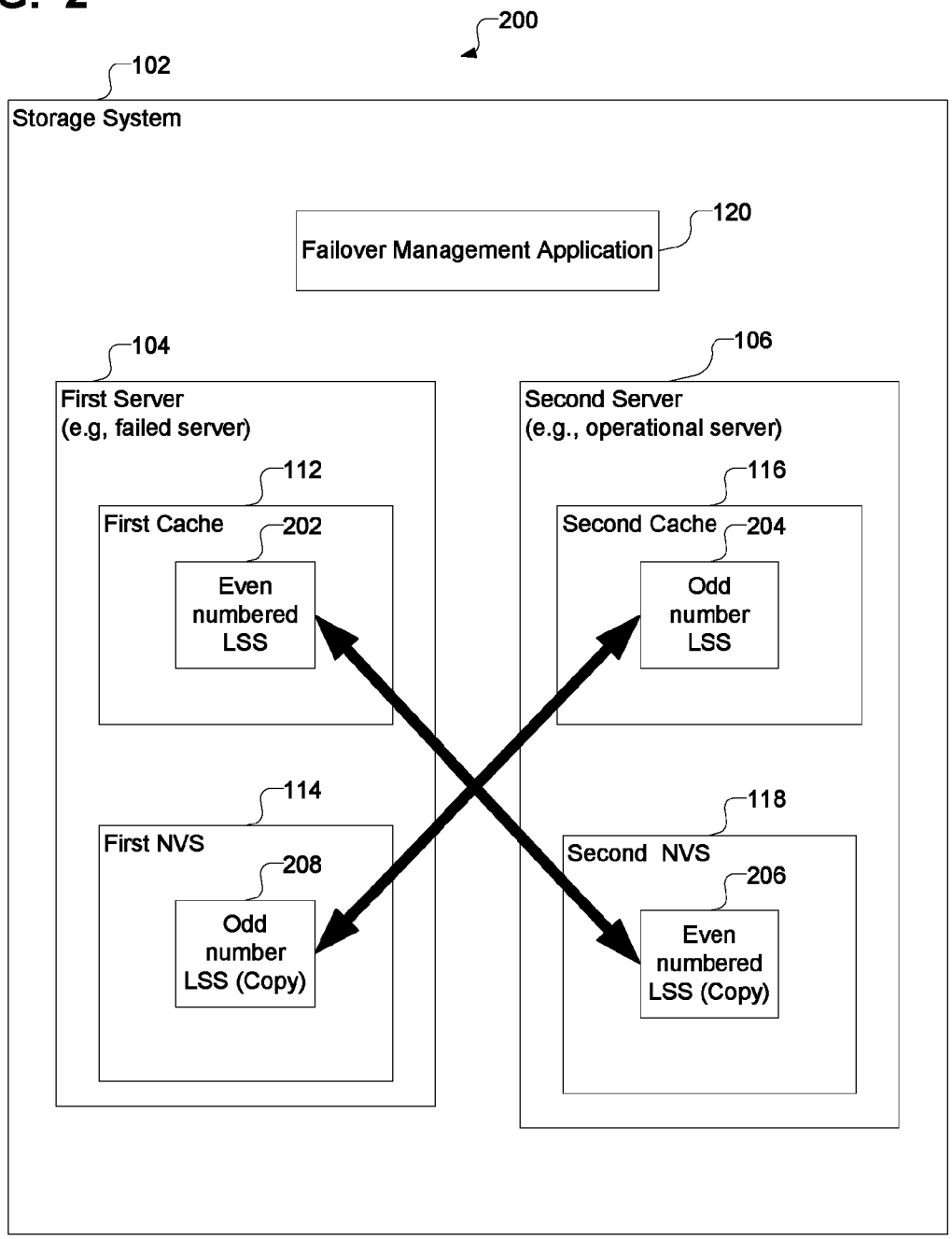
FIG. 2 illustrates a block diagram of the storage system with a first cache and a first NVS controlled by the first server, and a second cache and a second NVS controlled by the second server, wherein the first server is shown undergoes a failure while the second server remains operational, in accordance with certain embodiments.

FIG. 2 illustrates a block diagram 200 of the storage system 102 with a first cache 112 and a first NVS 114 controlled by the first server 104, and a second cache 116 and a second NVS 118 controlled by the second server 106, wherein the first server 104 undergoes a failure while the second server 106 remains operational in accordance with certain embodiments.

The first cache 112 is used for all logical volumes that are members of even numbered logical storage systems (LSS) 202. It may be noted than an LSS is a logical construct that groups logical volumes and logical units (LUN) in groups, where in certain embodiments the LSSs may be numbered via integers starting from 0 to and ending at 255 if there are 256 LSSs. Likewise, the second cache 116 is used for all logical volumes that are members of odd numbered LSSs 204. For every write that is placed into the first cache 112 of the first server 104, a copy 206 is placed into the second NVS 118 that is in the second server 106. For every write that is placed into the second cache 116 of the second server 106, a copy 208 is placed into the first NVS 114 that is in the first server 104. As a result, in case of failure of the first server 104, the second server 106 may be used for recovery of data, and in case of failure of the second server 106 the first server 104 may be used for the recovery of data.

In certain embodiments shown in FIG. 2, the failover management application 120 maintains the first cache 112 in synchronization with the second NVS 118, and the second cache 116 in synchronization with the first NVS 114, where in certain embodiments the failover management application 120 may comprise one or more applications or may be part of another application.

In FIG. 2, for every write that is placed into the first cache 112 of the first server 104, a copy is placed into the NVS 118 that is in the second server 106. In certain embodiments shown in FIG. 2, the failover management application 120 that executes in the storage system 102 provides a mechanism that is performed during failover (e.g., a the first server 104 has failed) to quickly perform retrostore operations to transfer the data stored in the cache 116 of the operational server into the NVS 118 of the operational server 106 to protect the data against a power loss.

Figure 3:
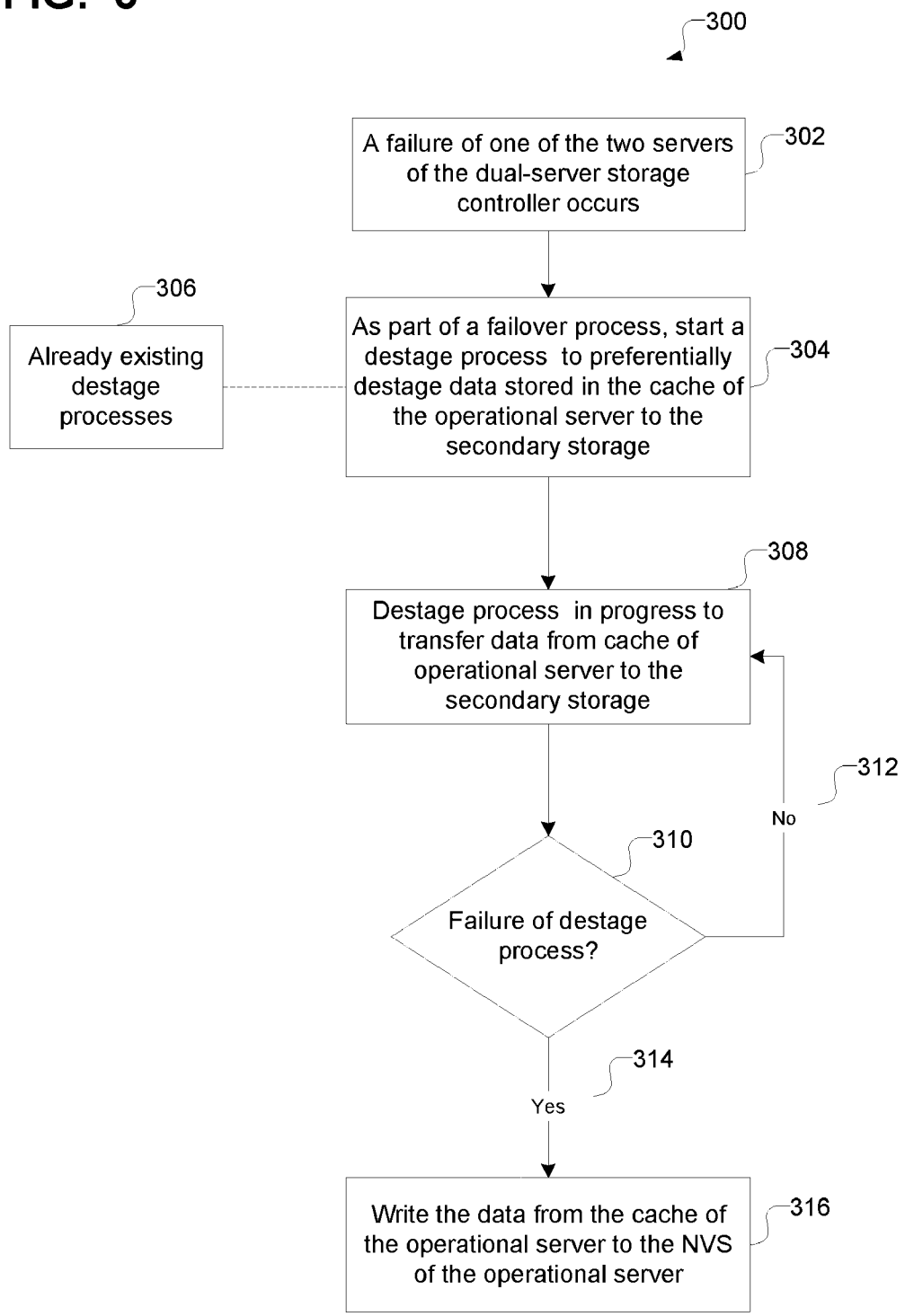
FIG. 3 illustrates a flowchart that shows operations performed in prior art during a failover process, in accordance with certain embodiments.

FIG. 3 illustrates a flowchart 300 that shows operations performed in prior art during a failover process, in accordance with certain embodiments.

In FIG. 3, control starts at block 302 in which a failure of one of the two servers 104, 106 of the storage controller 102 occurs. For example, the first server 104 undergoes a failure. Control proceeds to block 304 in which as part of a failover, a destage process to preferentially destage data stored in the cache 116 of the operational server (the second server 106) to the secondary storage (e.g., storage devices 122, 124) is started in association with already existing destage processes (shown via reference numeral 306).

Control proceeds to block 308 in which the destage process is in progress to transfer data from cache 116 of the operational server 106 to the secondary storage 122, 124. Periodically while the destage process of block 308 is being performed, a determination is made (at block 310) as to whether there is a failure of the destage process. If there is no failure of the destage process ("No" branch 312) control returns to block 308. However, if there is a failure of the destage process ("Yes" branch 314) then control proceeds to block 316 in which the data from the cache 116 of the operational server 106 is written to the NVS 118 of the operational server 106.

Figure 4:
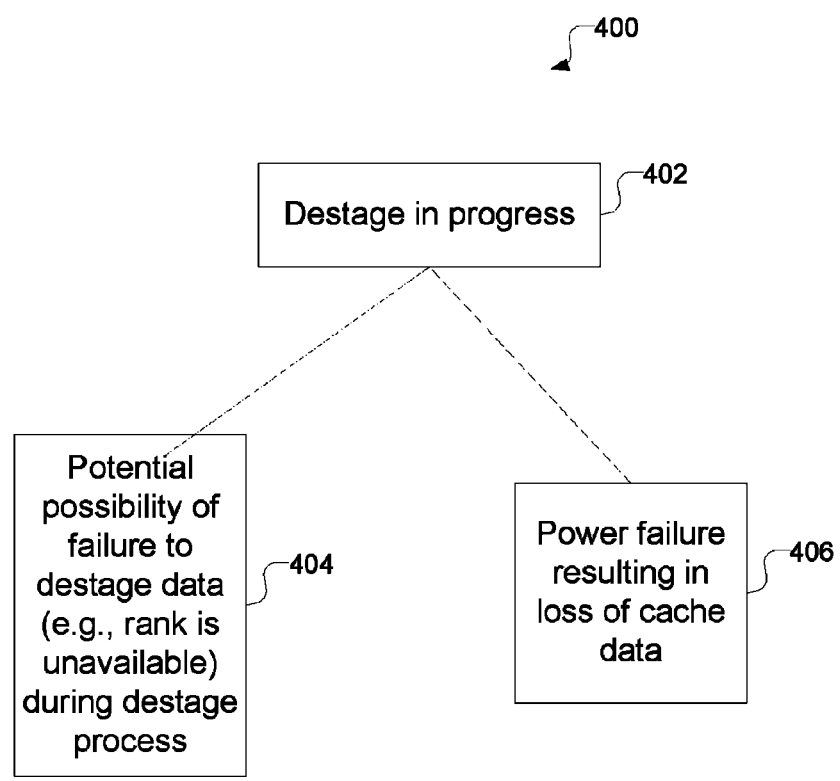
FIG. 4 illustrates a diagram that shows events that may occur during a destage that is in progress.

FIG. 4 illustrates a diagram 400 that shows events that may occur during a destage process that is in progress. During the time a destage is in progress (as shown via block 402) there may be a potential possibility of failure to destage data (as shown via block 404). For example, a rank [e.g., a redundant array of independent disks (RAID) rank] may become unavailable during the destage process causing a failure in the destage of data from the cache to secondary storage. Also, in certain embodiments, a power failure may occur resulting in a loss of data in the cache (as shown via block 406).

In certain embodiments it may take up to 90 seconds or more for a rank to become non-destageable (i.e., not able to be destaged). During this time, new host writes to a rank are allowed into NVS, tracks may just wait on a destage wait list. When the rank finally becomes a non-destageable, the tracks may not fit, and the only copy of the modified customer data may be in the cache, and the only copy is lost if a power failure occurs. Also, even if the ranks are able to destage, on a large NVS it can take many minutes to successfully destage the tracks to disk. During this time, if the storage system loses input power, the storage system may lose the modified customer data in the tracks in the cache, since the storage system is unable to preserve the cache on a power loss.

Figure 5:
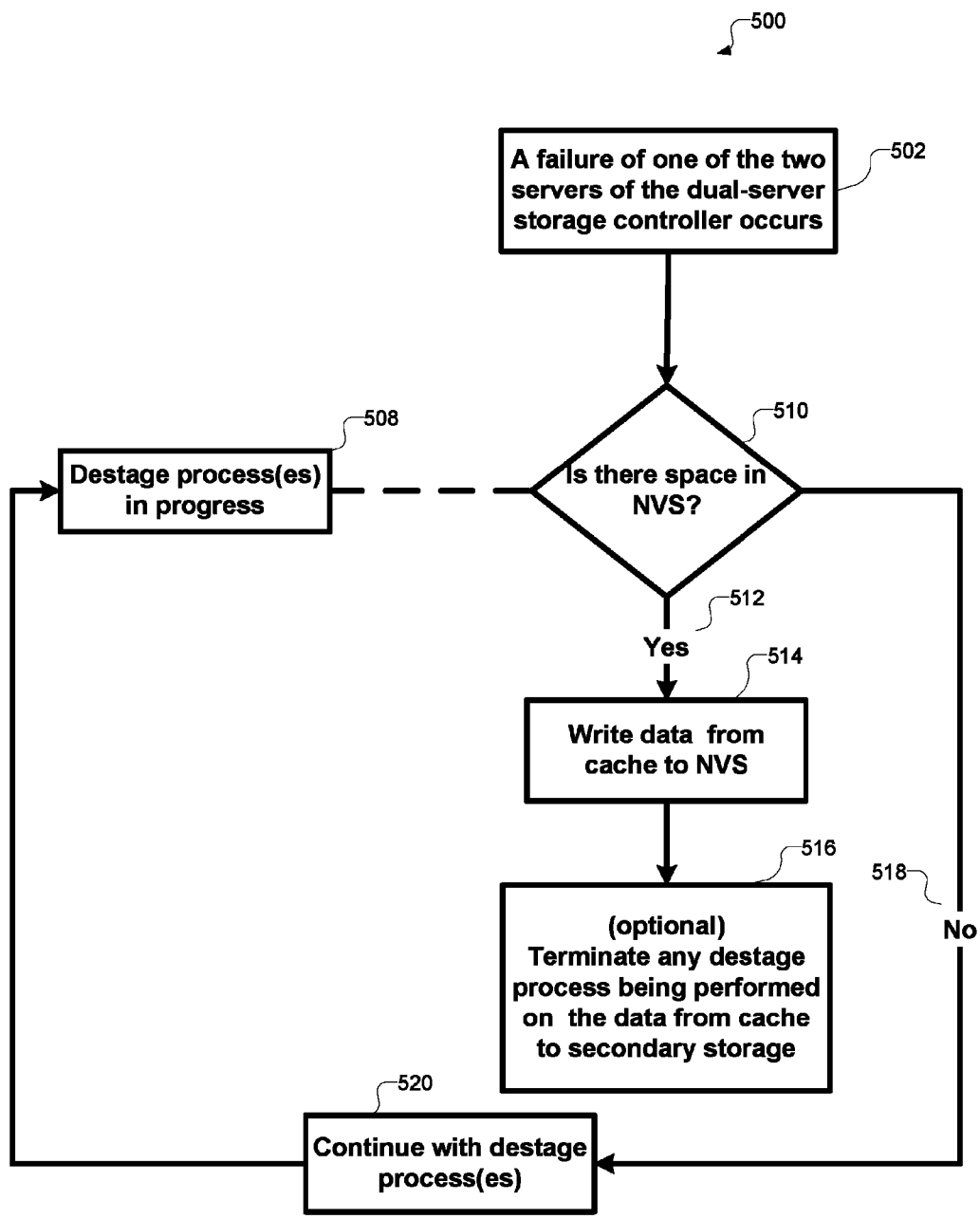
FIG. 5 illustrates a flowchart that shows operations performed during a failover process, in accordance with certain embodiments.

FIG. 5 illustrates a flowchart 500 that shows operations performed during a failover process, in accordance with certain embodiments. The operations shown in FIG. 5 may be performed by the failover management application 120 that executes in the storage controller 102.

In FIG. 5, control starts at block 502 in which a failure of one of the two servers 104, 106 of the storage controller 102 occurs. For example, the first server 104 undergoes a failure.

From block 502, while already existing destage processes are in progress (as shown via reference numeral 508) control proceeds to block 510, in which the failover management application 120 determines whether there is available space in the NVS 118 of the operational server 106. If so ("Yes" branch 512) control proceeds to block 514 in which the failover management application 120 writes data from the cache 116 to the NVS 118. Control proceeds to block 516 in which the failure management application 120 optionally terminates any destage processes being performed on data from the cache 116 to the secondary storage 122, 124.

If at block 510, there is no failure of the destage process ("No" branch 518) the destage processes are continued (at block 520) and control returns to block 508.

Therefore, FIG. 5 illustrates certain embodiments, in which while destage processes are in progress, a determination is made as to whether there is space in the NVS of the operational server, and if there is space then the data from the cache is written to the NVS by preempting destage processes in progress.

Figure 6:
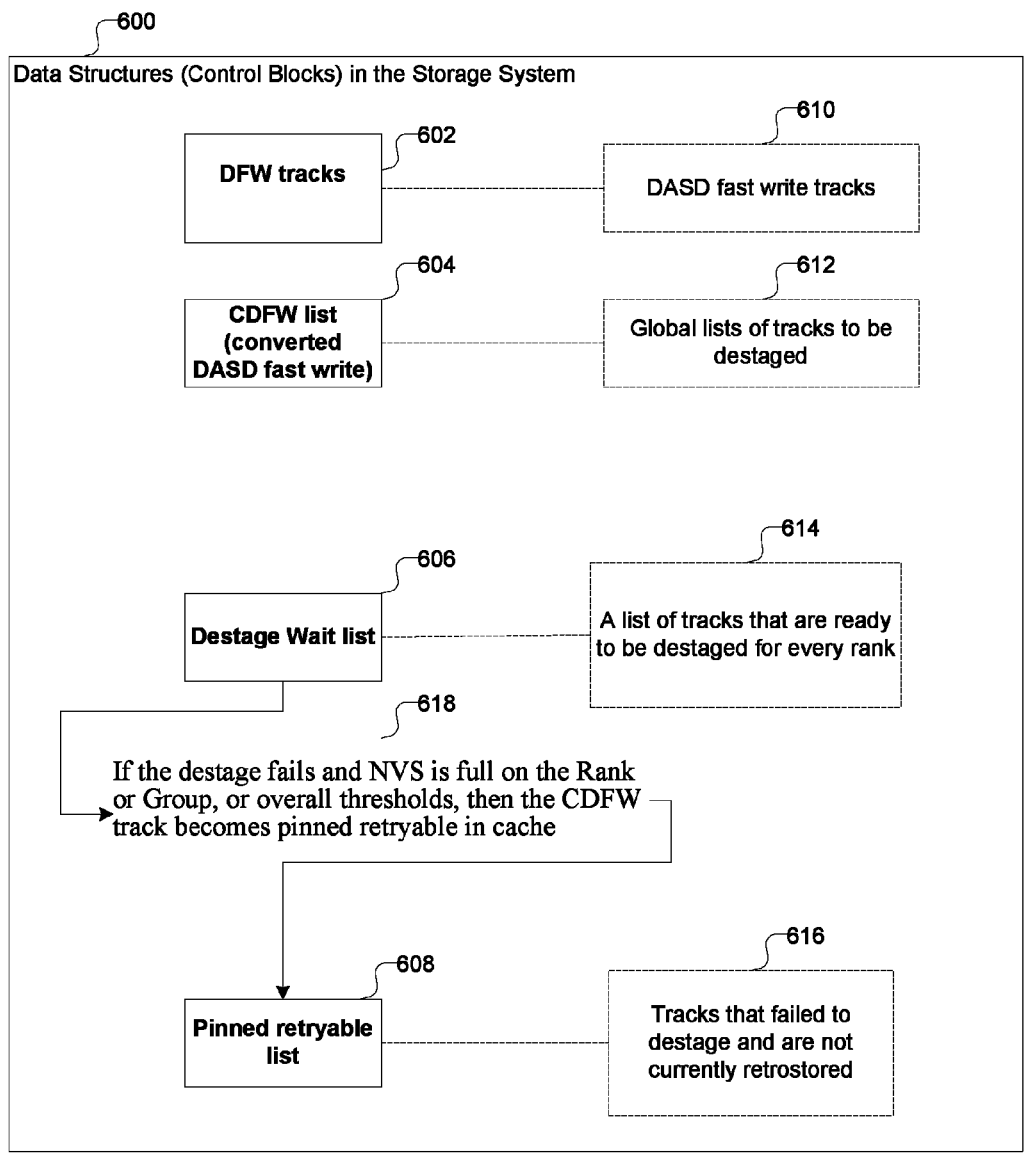
FIG. 6 illustrates a diagram that shows data structures in the storage system, in accordance with certain embodiments.

FIG. 6 illustrates a diagram 400 that shows data structures in the storage system 102, in accordance with certain embodiments. The data structures or control blocks of the storage system 102 may include representations for DFW tracks 602 (direct access fast write tracks), a CDFW list 604 (converted direct access fast write list), a destage wait list 606, and a pinned retryable list 608.

The DFW tracks data structure 602 represent the DASD fast write tracks for the storage system (shown via reference numeral 610). The CDFW list data structure 604 (converted DASD fast write list) comprises the global list of tracks to be destaged (shown via reference numeral 612). The destage wait list data structure 606 comprises a list of tracks that are ready to be destaged for every rank (shown via reference numeral 614). The pinned retryable list data structure 608 represents tracks that failed to destage and are not currently retrostored (as shown via reference numeral 616). In certain embodiments, if the destage fails and NVS is full on the Rank or Group, or overall thresholds, then the CDFW track becomes pinned retryable in cache (as shown via reference numeral 618). If space later opens up in NVS, then attempts are again made to perform retrostore operations on the CDFW tracks.

During a failover, a cache converts the DFW (DASD Fast Write) tracks 602 that were backed up by the NVS of the operational server to CDFW (Converted DASD Fast Write) tracks and places them on a CDFW List 604. Also during a failover, the cache may create cache tracks for every track in the local NVS, and set a restore required bit in each cache data control block (CDCB). At the end of the failover process, a cache least recently used (LRU) controller may move every track from the CDFW list to the appropriate Rank DWLs (Destage Wait Lists) 606. The cache may also performs a scan to find and restore every track that has the "Restore Required" bit set. These tracks need to be restored from NVS to cache before they can be destaged. By destaging these tracks, space is freed up in the local NVS.

Figure 7:
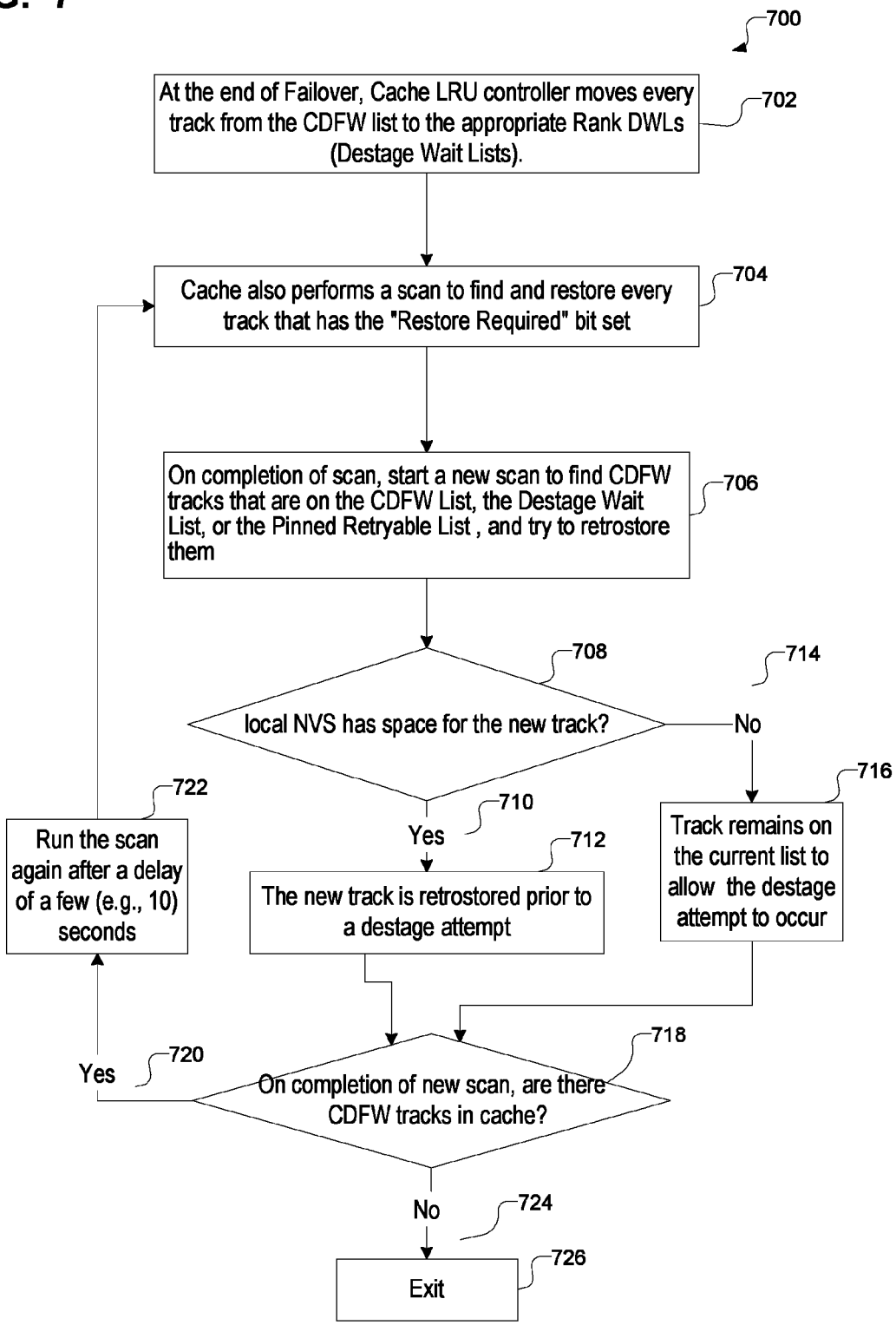
FIG. 7 illustrates a flowchart that shows operations performed during a failover process, in accordance with certain embodiments.

FIG. 7 illustrates a flowchart 700 that shows operations performed during a failover process, in accordance with certain embodiments. The operations shown in FIG. 7 may be performed by the failover management application 120 that executes in the storage controller 102.

At the end of failover, a cache least recently used (LRU) controller that operates under the control of the failover management application 120 moves (at block 702) every track from the CDFW list 604 to the appropriate Rank DWLs (Destage Wait Lists) 606. The cache under the control of the failover management application 120 also performs a scan to find and restore every track that has the "Restore Required" bit set (at block 704).

Once this scan completes, a new scan is initiated (at block 706) to find CDFW tracks that are on the CDFW List 604 the destage wait list 606, or the pinned retryable list 608, and try to retrostore the CDFW tracks.

From block 706 control proceeds to block 708, in which the failover management application 120 determines whether the local NVS has space for the new track, and if so ("Yes" branch 710) then the new track is retrostored (at block 712) prior to the destage attempt. If the local NVS does not have space ("No" branch 714) then the track remains (at block 716) on the current list to allow the destage attempt to occur. Once the new scan completes (at block 718 to which control flows from block 712, 714), if CDFW tracks remain in cache ("Yes" branch 720), then the scan is run (at block 722) after a delay of a few seconds (e.g., 10 seconds) and control returns to block 704.

If at block 718, it is determined that on completion of scan there are no CDW tracks in cache ("No" branch 724) then the process exceeds (block 726).

In many storage controllers, the cache code is able to maintain the NVSs at about half full. When a failover does occur, there should normally be enough room in NVS to absorb all of the resulting CDFW tracks in cache. Therefore, in many embodiments, the first scan to retrostore the CDFW tracks should succeed within a few seconds, and reduce the window for data loss due to losing power to a few seconds after a failover.

Figure 8:
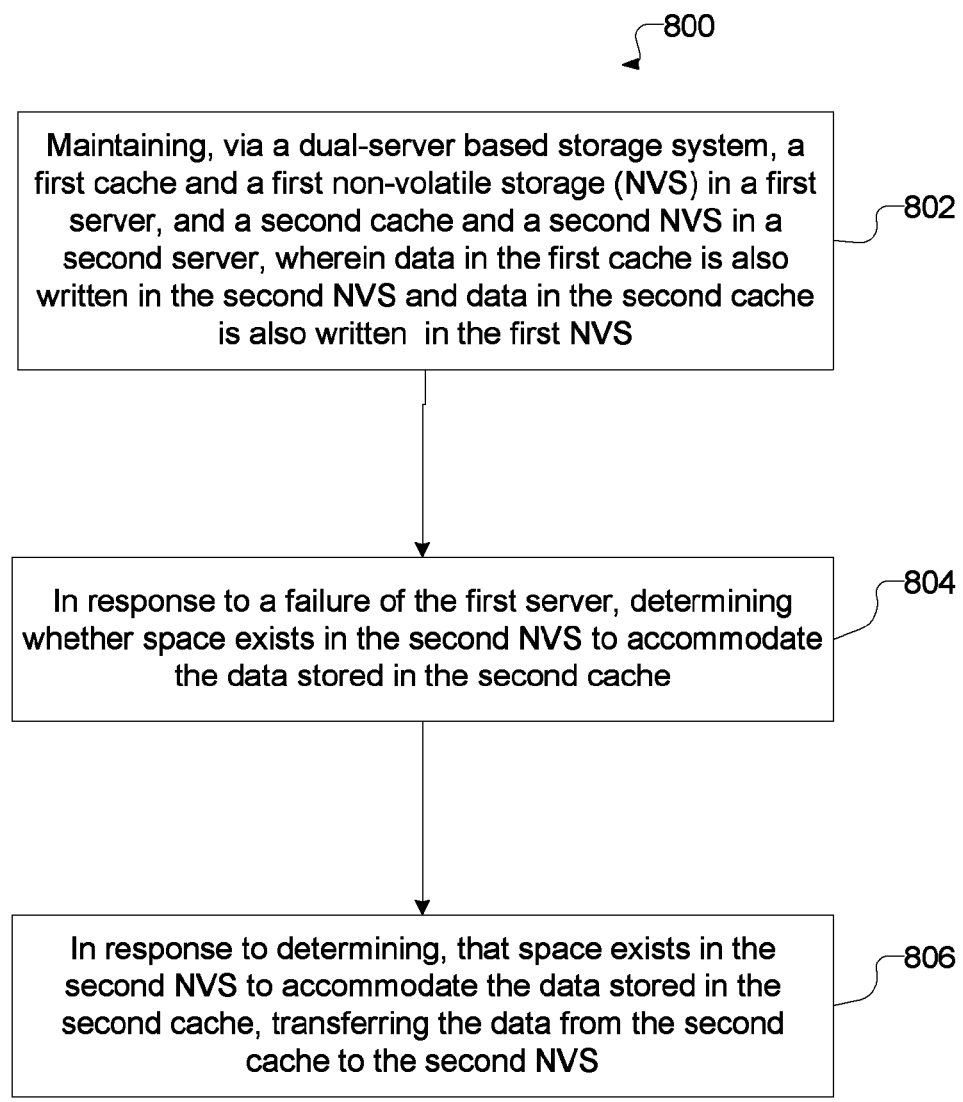
FIG. 8 illustrates another flowchart that shows operations performed during a failover process, in accordance with certain embodiments.

FIG. 8 illustrates a flowchart 800 that shows operations performed during a failover process, in accordance with certain embodiments. The operations shown in FIG. 8 may be performed by the failover management application 120 that executes in the storage controller 102.

Control starts at block 802, in which a dual-server based storage system 102 maintains a first cache 112 and a first non-volatile storage (NVS) 114 in a first server 104, and a second cache 116 and a second NVS 118 in a second server 106, where data in the first cache 112 is also written in the second NVS 118 and data in the second cache 116 is also written in the first NVS 114. In response to a failure of the first server 104, a determination is made (at block 804) as to whether space exists in the second NVS 118 to accommodate the data stored in the second cache 116. In response to determining that space exists in the second NVS 118 to accommodate the data stored in the second cache 116, the data is transferred (at block 808) from the second cache 116 to the second NVS 118.

In certain embodiments, the transferring of the data from the second cache 116 to the second NVS 118 is performed prior to an attempt to destage the data from the second cache 116 to secondary storage 122, 124 coupled to the dual-server based storage system 102. In further embodiments, a preemptive retrostore is performed from the second cache 116 to the second NVS 118 to avoid failure during destage operations from the second cache 116 to the secondary storage 122, 124.

Therefore FIGS. 1-8 illustrate certain embodiments in which, in the event of a failover in a dual-server based storage system, retrostore operations are performed to transfer tracks from the cache of the operational server to the NVS of the operational server if there is space in the NVS of the operational server, without waiting for time consuming destages to be performed from the cache of the operational server to secondary storage.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 9:
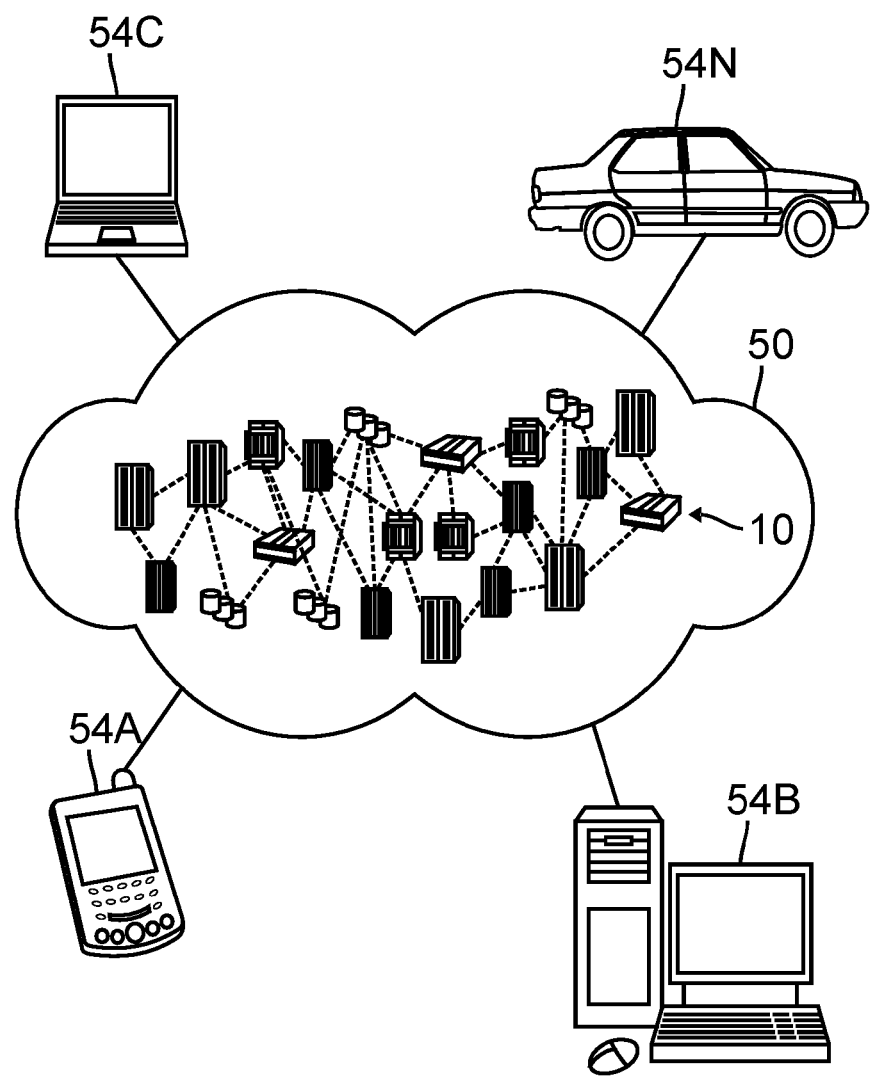
FIG. 9 illustrates a block diagram of a cloud computing environment, in accordance with certain embodiments.

Referring now to FIG. 9, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
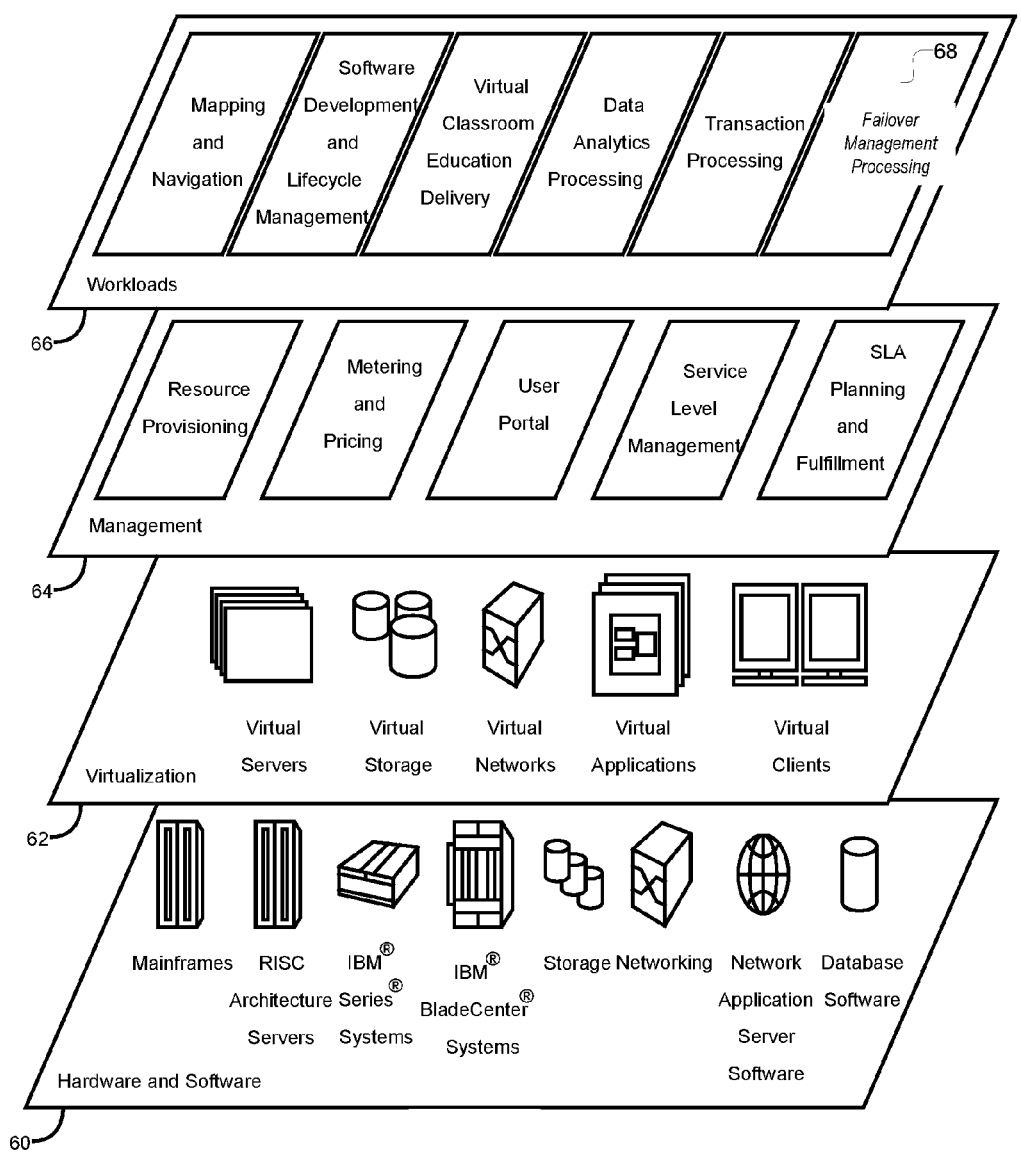
FIG. 10 illustrates a block diagram of further details of the cloud computing environment of FIG. 9, in accordance with certain embodiments.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the driver software and failover management processing 68 as shown in FIGS. 1-9.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 11:
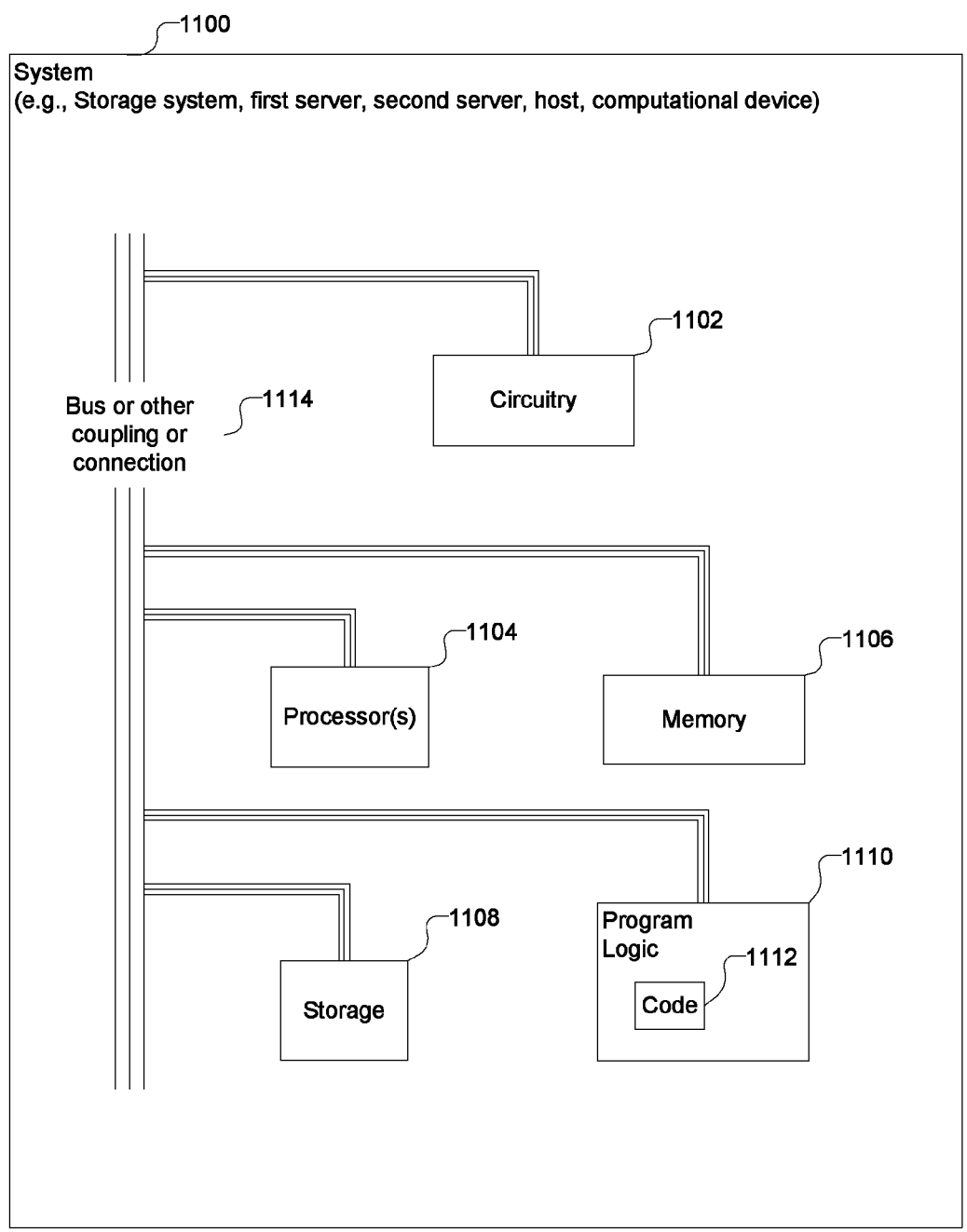
FIG. 11 illustrates a block diagram of a computational system that shows certain elements that may be included in the storage system and/or the host(s), as described in FIGS. 1-10, in accordance with certain embodiments.

FIG. 11 illustrates a block diagram that shows certain elements that may be included in the storage system 102, the first server 104, the second server 106, the hosts 108, 110 or other computational devices in accordance with certain embodiments. The system 1100 may include a circuitry 1102 that may in certain embodiments include at least a processor 1104. The system 1100 may also include a memory 1106 (e.g., a volatile memory device), and storage 1108. The storage 1108 may include a non-volatile memory device (e.g., EEPROM, ROM, PROM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. One or more of the components in the system 1100 may communicate via a bus or via other coupling or connection 1114. Therefore, while FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method comprising:
maintaining, via a dual-server based storage system, a first cache and a first non-volatile storage (NVS) in a first server, and a second cache and a second NVS in a second server, wherein data in the first cache is also written in the second NVS and data in the second cache is also written in the first NVS;
in response to a failure of the first server, determining whether space exists in the second NVS to accommodate the data stored in the second cache;
in response to determining that space exists in the second NVS to accommodate the data stored in the second cache, transferring the data from the second cache to the second NVS, and in response to completion of the transferring of the data from the second cache to the second NVS, terminating at least one destage process that is transferring data from the second cache to a secondary storage coupled to the dual-server based storage system; and
in response to determining that space does not exist in the second NVS to accommodate the data stored in the second cache, continuing to perform the at least one destage process that is transferring data from the second cache to the secondary storage coupled to the dual-server based storage system.

2. The method of claim 1, wherein a preemptive retrostore is performed from the second cache to the second NVS to avoid failure during destage operations from the second cache to the secondary storage, and wherein the preemptive retrostore allocates space in the second NVS, allocates an NVS track buffer, copies modified customer data from cache segments of the second cache to NVS segments of the second NVS, then sends a commit message to the second NVS.

3. The method of claim 1, the method further comprising:
in response to a failover, transferring every track from a converted direct access storage device fast write (CDFW) list to a destage wait list; and
performing, a scan to find and restore every track that has a restore required bit set.

4. The method of claim 3, the method further comprising:
in response to completion of the scan, starting a new scan to find CDFW tracks that are on a CDFW list, a destage wait list, or a pinned retryable list and initiating an attempt to retrostore the CDFW tracks.

5. The method of claim 4, wherein:
the CDFW list is a global list of tracks to be destaged;
the destage wait list is a list of tracks that are ready to be destaged for every rank; and
the pinned retryable list comprises tracks that failed to destage and are not currently retrostored.

6. The method of claim 5, wherein if the second NVS is full then a CDFW track is added to the pinned retryable list.

7. A system, comprising:
a memory; and
a processor coupled to the memory, wherein the processor performs operations, the operations comprising:
maintaining a first cache and a first non-volatile storage (NVS) in a first server, and a second cache and a second NVS in a second server, wherein data in the first cache is also written in the second NVS and data in the second cache is also written in the first NVS;
in response to a failure of the first server, determining whether space exists in the second NVS to accommodate the data stored in the second cache;
in response to determining that space exists in the second NVS to accommodate the data stored in the second cache, transferring the data from the second cache to the second NVS, and in response to completion of the transferring of the data from the second cache to the second NVS, terminating at least one destage process that is transferring data from the second cache to a secondary storage coupled to the system; and
in response to determining that space does not exist in the second NVS to accommodate the data stored in the second cache, continuing to perform the at least one destage process that is transferring data from the second cache to the secondary storage coupled to the system.

8. The system of claim 7, wherein a preemptive retrostore is performed from the second cache to the second NVS to avoid failure during destage operations from the second cache to the secondary storage, and wherein the preemptive retrostore allocates space in the second NVS, allocates an NVS track buffer, copies modified customer data from cache segments of the second cache to NVS segments of the second NVS, then sends a commit message to the second NVS.

9. The system of claim 7, the operations further comprising:
in response to a failover, transferring every track from a converted direct access storage device fast write (CDFW) list to a destage wait list; and
performing, a scan to find and restore every track that has a restore required bit set.

10. The system of claim 9, the operations further comprising:
in response to completion of the scan, starting a new scan to find CDFW tracks that are on a CDFW list, a destage wait list, or a pinned retryable list and initiating an attempt to retrostore the CDFW tracks.

11. The system of claim 10, wherein:
the CDFW list is a global list of tracks to be destaged;
the destage wait list is a list of tracks that are ready to be destaged for every rank;
the pinned retryable list comprises tracks that failed to destage and are not currently retrostored.

12. The system of claim 10, wherein if the second NVS is full then a CDFW track is added to the pinned retryable list.

13. A computer program product, the computer program product comprising a computer readable storage medium having computer readable program code embodied therewith, the computer readable program code configured to perform operations in a dual-server based storage system, the operations comprising:
maintaining, via the dual-server based storage system, a first cache and a first non-volatile storage (NVS) in a first server, and a second cache and a second NVS in a second server, wherein data in the first cache is also written in the second NVS and data in the second cache is also written in the first NVS;
in response to a failure of the first server, determining whether space exists in the second NVS to accommodate the data stored in the second cache;
in response to determining that space exists in the second NVS to accommodate the data stored in the second cache, transferring the data from the second cache to the second NVS, and in response to completion of the transferring of the data from the second cache to the second NVS, terminating at least one destage process that is transferring data from the second cache to a secondary storage coupled to the dual-server based storage system; and
in response to determining that space does not exist in the second NVS to accommodate the data stored in the second cache, continuing to perform the at least one destage process that is transferring data from the second cache to the secondary storage coupled to the dual-server based storage system.

14. The computer program product of claim 13, wherein a preemptive retrostore is performed from the second cache to the second NVS to avoid failure during destage operations from the second cache to the secondary storage, and wherein the preemptive retrostore allocates space in the second NVS, allocates an NVS track buffer, copies modified customer data from cache segments of the second cache to NVS segments of the second NVS, then sends a commit message to the second NVS.

15. The computer program product of claim 13, the operations further comprising:
in response to a failover, transferring every track from a converted direct access storage device fast write (CDFW) list to a destage wait list; and
performing, a scan to find and restore every track that has a restore required bit set.

16. The computer program product of claim 15, the operations further comprising:
in response to completion of the scan, starting a new scan to find CDFW tracks that are on a CDFW list, a destage wait list, or a pinned retryable list and initiating an attempt to retrostore the CDFW tracks.

17. The computer program product of claim 16, wherein:
the CDFW list is a global list of tracks to be destaged;
the destage wait list is a list of tracks that are ready to be destaged for every rank; and
the pinned retryable list comprises tracks that failed to destage and are not currently retrostored; and
if the second NVS is full then a CDFW track is added to the pinned retryable list.

* * * * *